United States Patent [19]
Vlasbloem

[11] 3,935,461
[45] Jan. 27, 1976

[54] SCINTILLATING CAMERA

[75] Inventor: Hugo Vlasbloem, Maasland, Netherlands

[73] Assignee: N.V. Optische Industrie "de Oude Delft", Delft, Netherlands

[22] Filed: Feb. 27, 1974

[21] Appl. No.: 446,470

[30] Foreign Application Priority Data
Mar. 9, 1973 Netherlands.................... 7303407

[52] U.S. Cl............................... 250/368; 250/369
[51] Int. Cl.².......................................... G01T 1/20
[58] Field of Search ............ 250/361, 363, 368, 369

[56] References Cited
UNITED STATES PATENTS

| | | | |
|---|---|---|---|
| 3,531,651 | 9/1970 | Lieber et al. .................. | 250/369 X |
| 3,598,994 | 8/1971 | Markle........................... | 250/369 X |
| 3,622,786 | 11/1971 | Walker et al. ................. | 250/368 X |
| 3,793,519 | 2/1974 | Mallard et al. ................ | 250/369 X |

Primary Examiner—Archie R. Borchelt
Attorney, Agent, or Firm—Arthur B. Colvin

[57] ABSTRACT

The invention relates to a scintillating camera and in particular to an apparatus for determining the position coordinates of a light pulse emitting point on the anode of an image intensifier tube which forms part of a scintillating camera, comprising at least three photomultipliers which are positioned to receive light emitted by the anode screen on their photocathodes, circuit means for processing the output voltages of the photomultipliers to derive voltages that are representative of the position coordinates; a pulse-height discriminator circuit adapted to be fed with the sum voltage of the output voltages of the photomultipliers for gating the output of the processing circuit when the amplitude of the sum voltage of the output voltages of the photomultipliers lies in a predetermined amplitude range, and means for compensating the distortion introduced in the image on the anode screen.

8 Claims, 9 Drawing Figures

SCINTILLATING CAMERA

An apparatus of this kind is known from the French Patent Specification No. 1,586,904. The known apparatus for determining the position coordinates of a light pulse emitting point on the anode screen of an image intensifier tube forming part of a scintillating camera comprises four photomultipliers, which are positioned symmetrically with respect to the anode screen with their axis in parallel with the axis of symmetry of the anode screen. Signals representative of the position coordinates of a light emitting point on the anode screen are derived by dividing the difference signal of two output signals of two diametrically opposed multipliers by the sum signal of the output signals of said photomultipliers. While in fact the coordinates of the point in the layer of scintillating crystals is of interest to a user of a scintillating camera problems arise from the fact that image distortion is introduced by both the image intensifier tubes and the photomultipliers. As the image of the layer of scintillating material on the anode screen of the image intensifier tube as a result of the operation of the image intensifier tube contains pin-cushion distortion, the signals representative for the position coordinates of the light emitting point on the anode screen are not necessarily representative for the position coordinates of the point in the layer of scintillating material in which the scintillation took place, which scintillation gave rise to the emission of a light pulse by a point of the anode screen. The arrangement of the photomultipliers further introduces a barrel distortion. Depending on the number of image intensifier tubes the signals representative of the position coordinates of the light pulse emitting point on the anode screen may contain a barrel distortion or a pin-cushion distortion because the barrel distortion introduced by the photopultipliers is greater respectively smaller than the pin-cushion distortion introduced by the photomultipliers. Means for compensating the pin-cushion distortion in the image on the anode screen and the obviously larger barrel distortion introduced by the photomultipliers according to the French Pat. No. 1,586,904 consist of a disc which does not transmit light and which is centered on the axis of symmetry of the anode screen, said disc intercepting part of the light pulse emitted by points of the anode screen near the edge, as a result of which a supplementary pin-cushion distortion is introduced. However, this solution cannot be used to introduce barrel distortion. Furthermore, it is a drawback that part of the light pulses in particular of those emitted by points near the edge of the anode screen is intercepted. This has the drawback that part of the light pulses is not used and that this known apparatus cannot be used to introduce barrel distortion, when the pin-cushion distortion introduced in the image on the anode screen is just partly compensated by the barrel distortion introduced by the photomultipliers.

According to the present invention, there is provided an apparatus for determining the position coordinates of a light pulse emitting point, wherein the means for compensating the distortion introduced in the image on the anode screen and the barrel distortion introduced by the photomultipliers are capable to compensate both a resulting barrel distortion and a pin-cushion distortion, whereas these means do not or hardly intercept light emitted by the anode screen.

An apparatus according to the invention is for this purpose characterized in that the means for compensating the distortion comprise a reflecting symmetrical surface, said surface being positioned in respect of the anode screen and the photomultipliers in order to reflect light emitted by the anode screen to at least one of the photomultipliers, the amount of light reaching a photomultiplier by reflection varying as a light emitting point with constant brightness on the anode screen moves from the center to the edge of the anode screen.

The invention will now be described in more detail, by way of example only, with reference to the accompanying drawings, in which:

FIG. 1 diagrammatically shows an apparatus for determining the position coordinates of a light-impulse emitting point, FIG. 2 diagrammatically shows the relative positions of the photomultipliers and the reflecting symmetrical surface, and FIG. 3 is a diagram showing the relation between the position coordinates of a light emitted point as measured and the real position coordinates of the relating point on the photocathode 4 of the tube 5 shown in FIG. 1, for the case that no reflecting surface is used, a reflecting surface is positioned in a first position and a reflecting surface is positioned in a second position.

FIG. 4b is a front elevational view taken in the direction of the arrows 4—4 of FIG. 4a.

FIG. 5b is a front elevational view taken in the direction of the arrows 5—5 of FIG. 5a.

Figure 1:
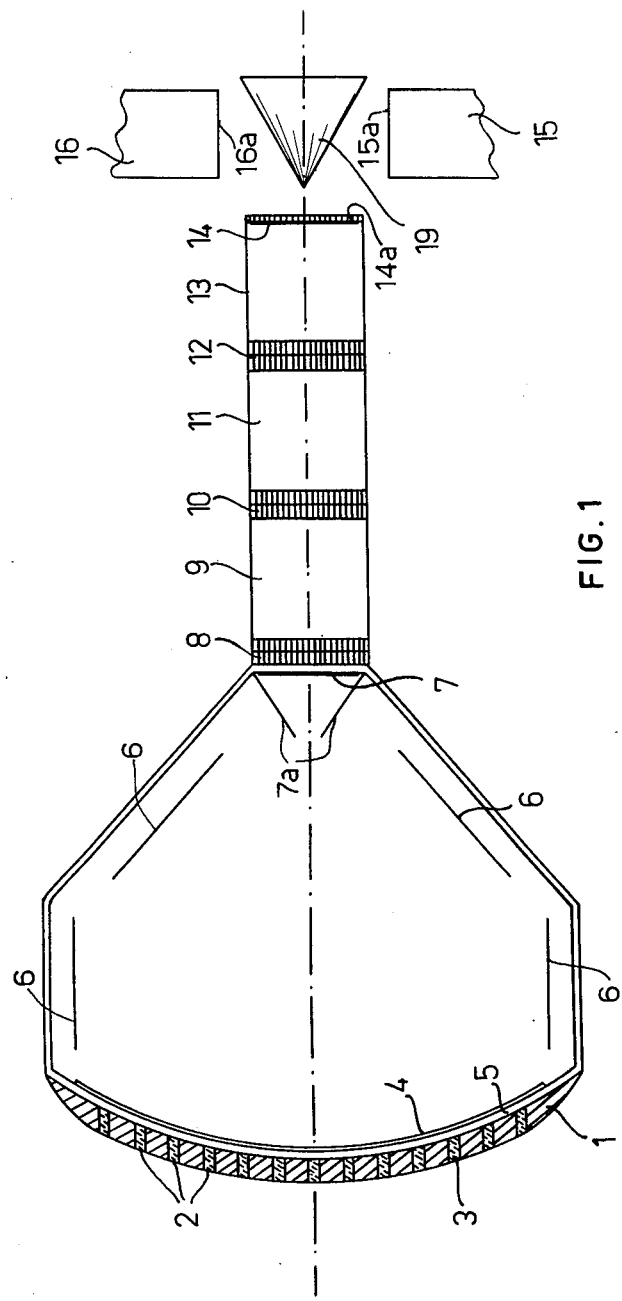

FIG. 1 diagrammatically shows a scintillating camera and an embodiment of an apparatus according to the invention. At 1 a plate is shown, which is provided with holes 2 in which scintillating material 3 is applied, which material emits a light pulse when struck by a γ-quant. The plate 1 operates as a collimator and for that purpose is made of lead for instance. A photocathode 4 is separated from the plate 1 by a glass window forming part of the tube housing 5 and positioned parallel to the plate 1. When as a result of the impact of a γ-quant the scintillating material in one of the holes 2 of the plate 1 a light pulse is emitted, a number of electrons is freed from the photocathode 4. These electrons are accelerated by means of a known electrode system shown at 6 to the anode screen 7, having an anode construction 7a. The anode screen 7 is made up of a material, i.e., ZuCds(Ag), which material when struck by electrons emits light. On the photocathode 8a of a first image intensifier tube 9, which forms part of a series of image intensifier tubes, i.e., three tubes 9, 11 and 13, separated by fiber optics 10 and 12, an image of the light pulse emitting point on the anode screen 7 is formed through the fiber optic 8.

In order to determine the position coordinates of a light pulse emitting point on the anode screen 14 of the last image intensifier tube 13, which light pulse emission results from a γ-quant impact is one of the holes 2 in the plate 1, in general a number of photomultipliers is positioned in respect of the anode screen in such a way that their photocathodes receive light from that anode screen through a fiber optics 14a. The signals representative of this position coordinates can be used to display the light pulse emitting point on the display screen of cathode ray tube, said screen having a greater persistence than the anode screen 14, or can be fed into the storage of a computer.

In the known apparatus the output signals of four photomultipliers, having their cathodes positioned in coplanar alignment at the corners of a square centered on the axis of symmetry of said anode screen, are fed to an adder circuit, a subtractor circuit and a divider circuit and also to a pulse-height discriminator circuit. From each two diametrically opposed photomultipliers the difference signal and sum signal are derived.

As a signal representative for the X-position coordinate the signal obtained by deriving the difference signal divided by the sum signal of one pair diametrically opposed photomultipliers is used. From the output signals of the other two photomultipliers a signal representative of the Y-coordinate of the light-impulse emitting point on the anode screens 14 is derived in the same way.

Furthermore, the sum signal of the output signals of the four photomultipliers is fed to the pulse-height discriminator circuit. The pulse-height discriminator circuit is set to give an output signal if and only if the sum signal of the output signals of the four photomultipliers lies within a predetermined amplitude range. The output signal of the pulse-height distriminator circuit is used to gate the circuits for determining the X- and Y-position coordinate signals.

Figure 2:
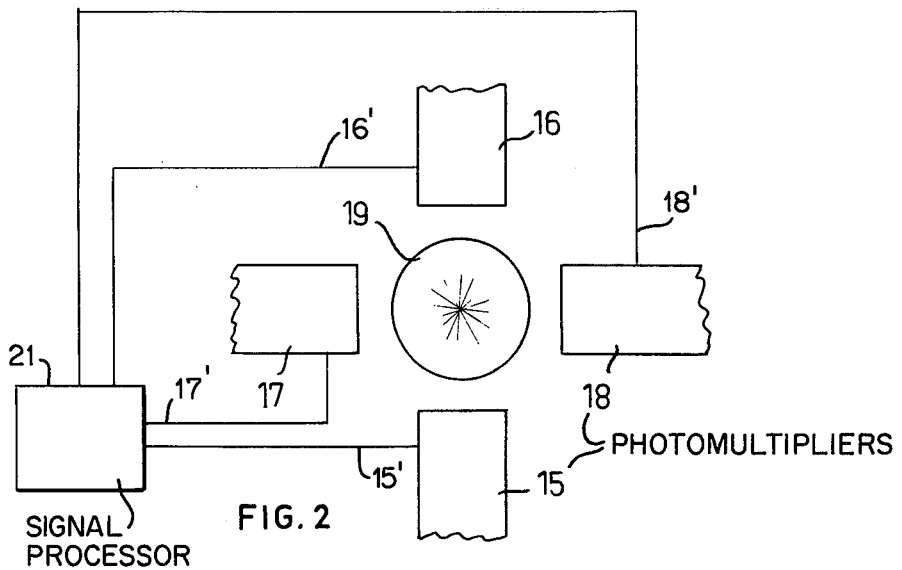

As shown in FIGS. 1 and 2, the photomultipliers 15, 16, 17 and 18 are positioned with their axis perpendicular to the axis of the scintillating camera. Furthermore, the cone-shaped body 19 is shown, which body has a reflecting outer surface and is positioned in order to reflect light emitted by the anode screen 14 to one or more of the photomultipliers 15, 16, 17 and 18. As schematically shown in the instant embodiment, the outputs of the photomultipliers 15, 16, 17, 18 are via conductors 15', 16', 17', 18' fed to a signal processing apparatus 21 embodying the circuit means as previously described. Said circuit means may, as noted, include a pulse height discriminating circuit for gating the circuit means responsive to signals in a predetermined amplitude range derived from said photomultipliers.

It will be understood that in general a convenient chosen apex angle of the cone-shaped body 19 and distance between the top of the body and the anode screen 14 provides a certain course of the amount of light reflected by the body to the cathodes 15a, 16a, 17a and 18a of the photomultipliers when a light-pulse emitting point of constant brightness moves from the center of the anode screen to the edge of it.

Furthermore, this course will be influenced by the shape of the base of the cone-shaped body, which base may be a square, a cushion, a barrel or a circle.

Furthermore, the generatrix of the cone-shaped body 19 may be inwardly or outwardly curved, while in case the base has the form of a square the surfaces of the body may be inwardly or outwardly curved in cross direction.

The reflecting surface may also be the inner surface of a cone-shaped shell, in which the base of the body is turned to the anode screen 14.

In order to compensate a resulting pin-cushion distortion shape and arrangement in respect of the anode screen 14 have to be chosen in such a way, that for a point emitting light of constant brightness moving from the center of the anode screen to its edge in the direction of the positive X-coordinate the amount of light reflected to the photomultiplier positioned in that direction decreases.

In the other case, that is compensating of a resulting barrel distortion, it is necessary that for a light emitting point moving from the center to the edge of the anode screen the amount of reflected light received by said photomultiplier increases.

Figure 3:
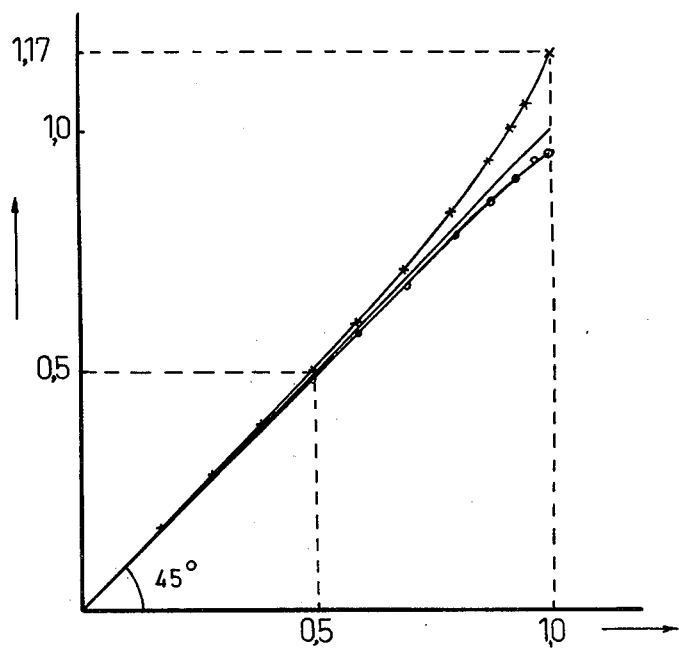

If, as shown in FIG. 1, three photomultipliers are connected in series, experiments show a resulting pin-cushion distortion. FIG. 3 shows for a number of cases the relation between the position coordinates as measured and the real position coordinates, that is the position coordinates of the point of the photocathode 4 of tube 5 in FIG. 1.

In an apparatus having a circular anode screen 14 with diameter of 25 mm and a shape as shown in FIG. 1, further having the following characteristics:
  the photocathodes of the photomultipliers 15, 16, 17 and 18 having a diameter of 32 mm;
  the distance between the photocathodes of two diametrically opposed photomultipliers being 50 mm;
  the shortest distance between the centers of the photocathodes of photomultipliers and the plane of the anode screen 14 being 22 mm;
  the reflecting surface 19 being the outer surface of a right-circular cone having an apex angle of 64°, the base having a diameter of 48 mm; the relation between the normalized position coordinates, derived from the output signals of the photomultipliers 15, 16, 17 and 18 and the normalized position coordinates, that is coordinates of a point divided by the diameter of the photocathode 4 in one case and of the anode screen 14 in the other case, on the photocathode 4 of the tube 5, the distance between the top of the cone 19 and the center of the anode screen 14 being 6 mm, is shown by the curve drawn through the points indicated by a circle. It further appears that displacement of the cone 19 to a position, in which the distance between the top of the cone 19 and the center of the anode screen measures 8 mm, leads to a relation as shown by the straight line including an angle of 45° with the abscis.

Increasing the distance between the top of cone 15 and the center of the anode screen 14 the relation appears to be shown by the curve drawn through the points indicated by a cross.

It will be clear that the reflecting surface gives the possibility to compensate the distortion without intercepting light emitted by the anode screen.

Figure 4A:
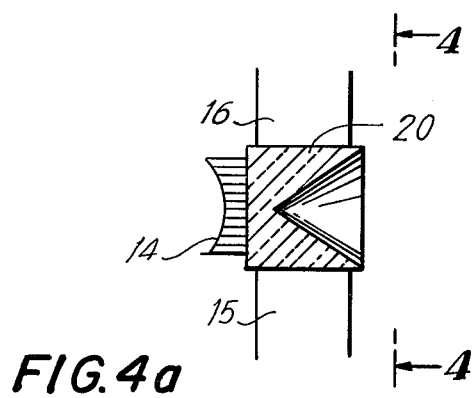
FIG. 4a is a diagrammatic side elevational view of the photomultipliers, reflecting surface and anode screen in accordance with an embodiment of the invention.
Figure 4B:
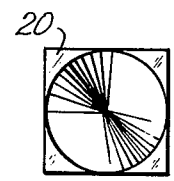

The embodiment of FIGS. 4a and 4b is similar in all respects to the preceding described embodiment with the exception that the images on photomultipliers 15 and 16 are produced by reflections from reflective conic surface 19a formed in a cavity of transparent body 20.

Figure 5A:
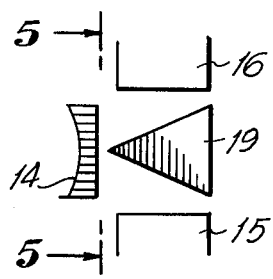
FIG. 5a is a diagrammatic side elevational view of the photomultipliers, reflecting surface and anode screen in accordance with an embodiment of the invention.
Figure 5B:

In FIGS. 5a and 5b, the reflections on photomultipliers 15 and 16 are produced by a cone 19b, the base of which is square.

Figure 5C:
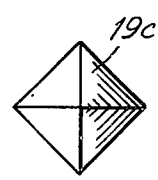
FIG. 5C is an embodiment similar to that of FIG. 5b except that the conic reflecting surface has been rotated 45°.

In FIG. 5c there is shown still a different form of reflective cone 19c, the cone 19c being arranged in the same position as occupied by cone 19b as depicted in FIG. 5a, except that the cone 19c is rotated 45° about its major axis.

Figure 6:
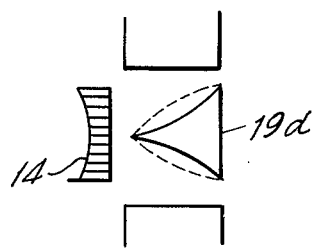
FIG. 6 is a diagrammatic side elevational view of still a further embodiment of the invention.

In FIG. 6 there is shown a conical member 19d, the generatrix of which is curved in a concave manner —see full line position. The dash lines appearing in FIG. 6 disclose still a further form of cone wherein the generatrix is curved in a convex manner.

Having thus described my invention, what I claim as new and desire to secure by Letters of Patent of the United States is:

1. Apparatus for determining the position of a light pulse emitting point on the anode screen of an image intensifier tube forming a part of a scintillating camera comprising at least three photomultipliers, circuit means operatively connecting said photomultipliers to derive voltages representative of the position coordinates, said circuit means including a pulse height discriminator circuit for gating said circuit means responsive to signals in a predetermined amplitude range derived from said photomultipliers, said device being characterized by distortion compensating means for transferring to said photomultipliers the image produced on said anode screen, said distortion compensating means comprising a reflecting surface symmetrical with respect to the said anode screen and the photocathodes of said photomultipliers, said surface being positioned to reflect light emitted by said anode screen to said photocathodes, said surface being configurated and spaced relative to said anode screen and photomultipliers to vary the intensity of an image reflected on said photocathodes as a function of the position on said anode of a light emitting point of constant brightness.

2. Apparatus in accordance with claim 1 wherein there are included four said photomultipliers, said photomultipliers being positioned with the axes of symmetry of their photocathodes coincident with the legs of a cross, the axis of symmetry of said cross being coincident with the axis of symmetry of said anode screen, said reflecting surface being conical about an axis of symmetry coincident with the axis of symmetry of said anode screen.

3. Apparatus in accordance with claim 2 wherein said reflective surface is formed on the surface of a cone-shaped cavity of a light transmitting body.

4. Apparatus according to claim 2, characterized in that said reflecting surface is the outer surface of a cone-shaped body, the apex of which is turned toward the anode screen.

5. Apparatus according to claim 4 characterized in that the base of the cone-shaped body is a circle.

6. Apparatus according to claim 4 characterized in that the base of the cone-shaped body is a square.

7. Apparatus according to claim 4 characterized in that the generatrix of the cone-shaped body is curved.

8. Apparatus according to claim 4 characterized in that the surfaces of the cone-shaped body are curved in crossdirection.

* * * * *